US006483672B1

(12) United States Patent
Arnett et al.

(10) Patent No.: US 6,483,672 B1
(45) Date of Patent: Nov. 19, 2002

(54) TRACK WIDTH CONTROL OF READBACK ELEMENTS WITH IONS IMPLANTATION IN A BOUNDING REGION OF TIP PORTION TO SELECTIVELY DEACTIVATE MAGNETIC SENSITIVITY THEREOF

(75) Inventors: Patrick Clinton Arnett, Morgan Hill, CA (US); David Cheekit Cheng, Palo Alto, CA (US); Sakhrat Khizroev, Pittsburgh, PA (US); David Allen Thompson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,951

(22) Filed: Jun. 30, 1999

(51) Int. Cl.$^7$ ................................................. G11B 5/39
(52) U.S. Cl. ....................................................... 360/313
(58) Field of Search ................................ 360/313, 322, 360/327

(56) References Cited

U.S. PATENT DOCUMENTS 3,887,944 A  * 6/1975  Bajorek et al.
5,260,652 A  * 11/1993 Collver et al.
5,844,756 A  * 12/1998 Saito

FOREIGN PATENT DOCUMENTS

JP  60-000612  * 1/1985
JP  04-275471  * 10/1992

OTHER PUBLICATIONS

"Deactivation of Magnetic Material Beneath Conductor Leads in Magnetoresisive Sensor Structures", IBM Technical Disclosure Bulletin, vol. 19, No. 1, pp. 356–357, Jun. 1, 1976.*
Yimin Guo et al. in "Low Fringe–Field and Narrow–Track MR Heads", IEEE Transactions on Magnetics, vol. 33, No. 5, Sep. 1997, pp. 2827–9.
G.J. Athas et al. "Focused Ion Beam System for Automated MEMS Prototyping and Processing", Proc. SPIE—Int. Soc. Opt. Eng. (USA), vol. 3223, 1997, pp. 198–207.
Charles Partee et al., "Off–Track Response Versus Shield Width at the ABS for MR Heads", IEEE Transactions on Magnetics (USA), vol. 33, No. 5, Pt. 1, Sep. 1997, pp. 2887–9.

* cited by examiner

*Primary Examiner*—Craig A. Renner
(74) *Attorney, Agent, or Firm*—Lumen Intellectual Property Services, Inc.

(57) ABSTRACT

Both the read and write heads are trimmed to approximately 100 nm wide, indicated by Wr and Ww, respectively. The etch depth for the MR element, MR Trenches, is 200 nm and the etch depth for the write head, Write Trenches, is 1 μm. In order to confirm that inactive regions are actually those selected for irradiation, during trimming the center of the trimmed MR element has been offset by approximately 300 nm from the center of the original MR element. This offset is observed in the final result.

3 Claims, 4 Drawing Sheets

TRACK WIDTH CONTROL OF READBACK ELEMENTS WITH IONS IMPLANTATION IN A BOUNDING REGION OF TIP PORTION TO SELECTIVELY DEACTIVATE MAGNETIC SENSITIVITY THEREOF

FIELD OF INVENTION

This invention relates to the field of track width control in readback elements such as magnetoresistive, giant magnetoresistive and spin tunneling heads.

BACKGROUND OF THE INVENTION

Increasing areal density of magnetic storage media requires that the magnetic recording and reading heads be able to operate at ever-decreasing track widths. The width of the recorded track is determined, among other parameters, by the width of the write pole of the write head and the flying height of the write head. The size and geometry of the shields and leads also play a role in determining the recorded track width.

The prior art teaches that a write pole of the write head can be micro-machined to create a narrower write pole tip. The narrower write pole tip enables one to record magnetic domains, which represent information, in narrower tracks. In addition, it is known that to utilize the narrower tracks the erase-band width of the recording head must also be reduced. The erase-bands are the regions on both sides of the track where the field generated by the write pole is not sufficiently strong to write, but strong enough to erase previously recorded information. The prior art teaches trimming or otherwise altering the shape of the top pole of the write head to reduce the size of this erase-band. For example, Yimin Guo et al. in "Low Fringe-Field and Narrow-Track MR Heads", IEEE Transactions on Magnetics, Vol. 33, No. 5, September 1997, pp. 2827–9 teach a focused ion beam (FIB) technique to pattern MR heads into different geometry at track edges to reduce the erase-band width. This is done in an integrated read/write head in which the shared pole is trimmed to minimize the side-erase field.

In order to take advantage of the narrower write track width and reduced side-erase fields, it is imperative that the read track width of the readback element or read head be reduced as well. The most popular types of read elements include magnetoresistive (MR) elements, giant magnetoresistive (GMR) elements and spin tunneling elements. At present, MR heads are typically made by photolithographically defining the active portion of the head. Unfortunately, due to practical limitations of the lithographic method, such as the diffraction limit of light, it is not economical to produce read heads much narrower than 500 nm. Meanwhile, MR head technology is already pushing present photolithographic techniques to their limits and these present methods will not be able to accommodate the next generation of MR heads.

The focused ion beam techniques for trimming write heads are described, e.g., by G. J. Athas et al. "Focused Ion Beam System for Automated MEMS Prototyping and Processing", Proc. SPIE—Int. Soc. Opt. Eng. (USA), Vol. 3223, 1997, pp. 198–207. Athas et al. suggest that the use of FIB techniques can be extended to milling the write pole and part of the upper shield of an integrated MR read head and inductive write head to reduce the MR head's track width. Further details describing how the track width of an MR head and the off-track response are affected by the shield width are described by Charles Partee et al., "Off-Track Response Versus Shield Width at the ABS for MR Heads", IEEE Transactions on Magnetics (USA), Vol. 33, No. 5, Pt. 1, September 1997, pp. 2887–9. Partee et al. employ FIB etching from the air bearing surface (ABS) of the slider in which the integrated head is mounted, to recess the shields by over 1 μm to optimize track performance.

The MR head itself is not FIB machined in the prior art. That is because electrostatic discharge (ESD) damage to the MR head can occur, as pointed out by Partee et al. (supra). In fact, the magnetic material of MR heads is very sensitive and the application of FIB directly to MR head for narrowing its pole tip would burn out the MR head. This would result in either an inoperable head or a head that is magnetically noisy.

In view of the state of the art, it would be desirable to provide an MR head or other readback element whose track widths can be adjusted directly. Furthermore, it would be an advance over the prior art if the width of the read pole tip of such read head could be processed without negatively impacting the performance of the read head.

OBJECTS AND ADVANTAGES

Accordingly, it is a primary object of the present invention to provide a readback element such as an MR head, a GMR head or a spin tunneling head in which the track width can be directly adjusted. Specifically, the effective track width of the read head is determined by the width of an active region of the pole tip.

It is another object of the invention to provide readback elements in which the tip portion adjustment is straightforward to implement at any point in the manufacturing process. In particular, the active region of the tip portion can be defined in a finished element.

The above objects and advantages, as well as numerous improvements attained by the readback element and method for making it are pointed out below.

SUMMARY

The objects and advantages of the invention are achieved by a readback element for reading magnetic domains recorded in a magnetic storage medium. The readback element can be a magnetoresistive (MR), a giant magnetoresistive (GMR) or a spin tunnel element. It is made of a magnetically active material having a magnetic sensitivity. The element has a tip portion with a surface for facing the magnetic medium. The tip portion has an active region of width W made up of the magnetically active material. The active region is bounded by an inactive region in which the magnetically active material is deactivated such that the inactive region has no or almost no magnetic sensitivity. Width W of the active region of the tip portion is preferably less than 100 nm.

The inactive region can be a region implanted with ions which render the active material inactive. For example, the inactive region can be implanted with gallium, chromium, helium, neon, xenon, hydrogen, oxygen, nitrogen or other suitable ions. This can be achieved by focused ion beam (FIB) implantation or other suitable implanting method. Alternatively, the inactive regions in the tip portion can be formed by selectively removing the active material. Removal of the active material in the regions to be deactivated can be performed by FIB removal, etching or any other suitable technique.

Readback elements in accordance with the invention can be produced separately or in a batch process. In fact, adjustment of width W of the active portion of the tip portion can be performed in a finished readback element.

DETAILED DESCRIPTION

Figure 1:
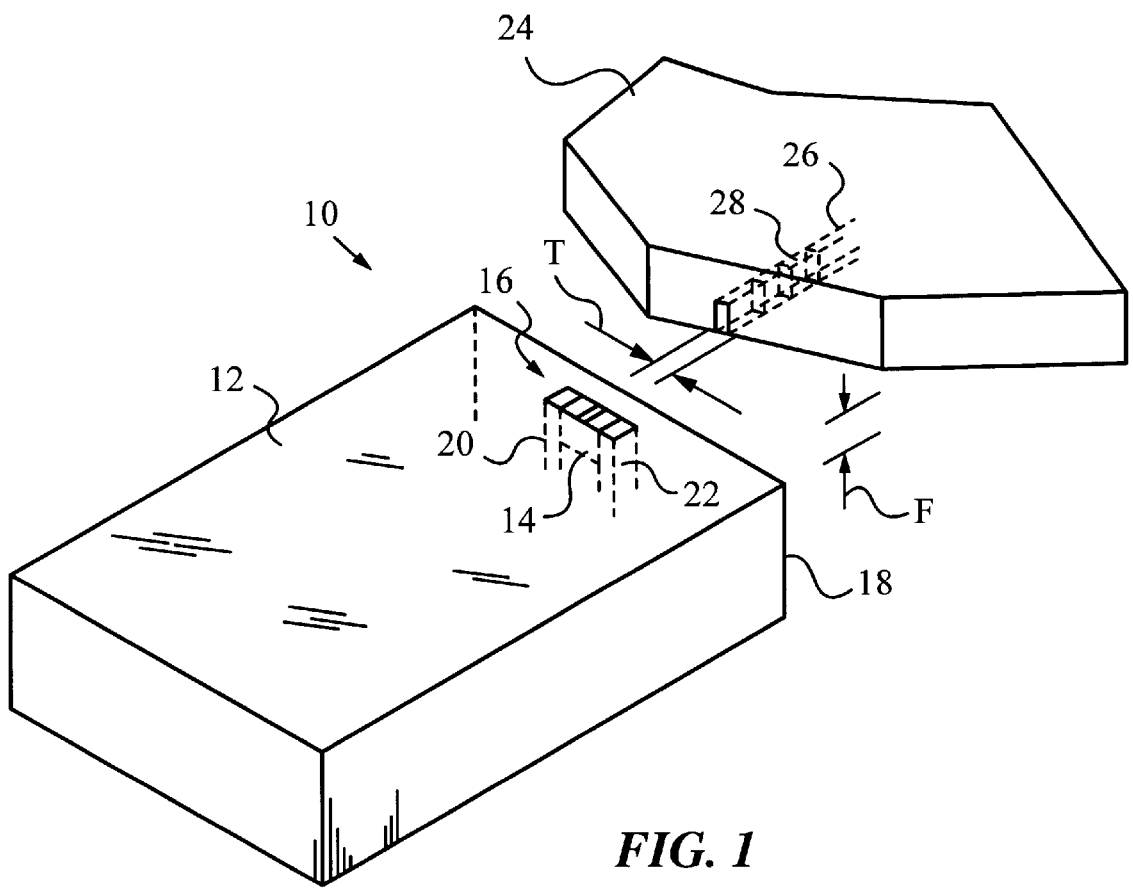
FIG. 1 is an isometric view of a slider with a readback element according to the invention.

FIG. 1 is an isometric view of an air-bearing slider 10 having an air bearing surface (ABS) 12. Slider 10 is equipped with a preferred readback element 14 according to the invention. A tip portion or tip 16 of element 14 is coplanar or nearly co-planar with air-bearing surface 12. Element 12 is located in the back portion of slider 10 near or at a back surface 18. A person of average skill in the art will recognize that element 12 can be a part of an integrated read/write head, such as a laminated or thin film type read/write head, which is not shown in the drawing.

Element 14 is flanked by leads 20, 22 for transmitting electrical signals generated by element 12 when reading data stored on a magnetic recording medium 24.

During operation slider 10 "flies" above recording medium 24. In fact, element 14 flies at a flying height F above medium 24. A track 26 of data in the form of magnetic domains 28 are recorded in medium 24. For example, domains 28 can be recorded in the longitudinal or perpendicular magnetic recording modes. Track 26 has an effective width T which is somewhat larger than the actual width of the pole tip of the write head which was used to write it. This is due to fringing effects of the magnetic fields created by the write head and by the fields arising from domains 28, as is sknown in the art.

Figure 2:
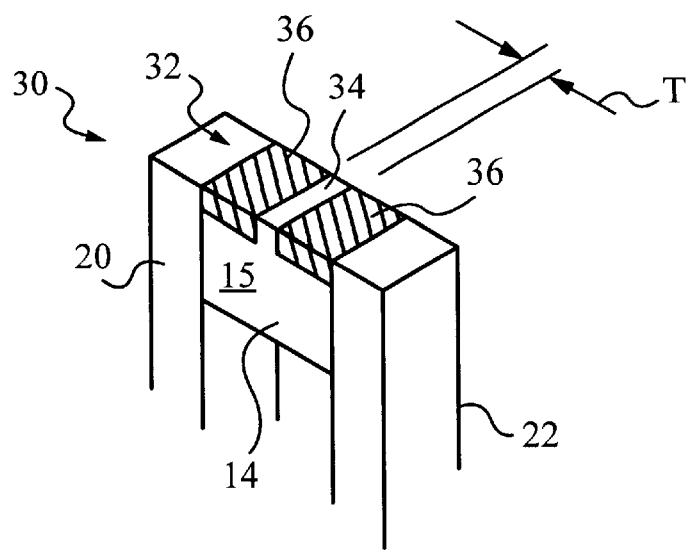
FIG. 2 is an isometric view of the readback element of FIG. 1.

FIG. 2 affords a more detailed view of element 14. Element 14 is made of a magnetically active material 15 and has the proper structure to convert a change in magnetic flux into an electrical signal. For example, element 14 is a magnetoresistive (MR), giant magnetoresistive (GMR) or spin tunnel or tunnel junction type read head. The magnetic susceptibility or sensitivity of element 14 is determined by magnetic material 15, which is preferably a composite of magnetic layers including at least one magnetically soft layer such as permalloy, as is commonly employed in MR, GMR or tunnel junction read heads.

A tip portion 30 of element 14 has a top face or surface 32. Surface 32 faces magnetic medium 24. Tip portion 30 has a centrally located active region 34 and an inactive region 36 bordering active region 34 on both sides. Active region 34 is the only portion of element 14 which senses the magnetic fields produced by domains 28. In particular, active region has a width W, which is on the order of track width T. Inactive region 36 has a negligibly low relative magnetic susceptibility (0 to 10), leading to low or zero magnetic sensitivity. In other words, active material 15 in inactive region 36 is deactivated or poisoned. Hence, inactive region 36 does not sense the magnetic fields produced by domains 28.

In high density recording track width T is less than 500 nm and may even be less than 100 nm. Correspondingly, width W ranges from 500 nm to 100 nm and less to match track width T with allowance for field fringing. Preferred element 14 can thus be used in disk drives having very narrow track widths T and high data densities. For example, element 14 can be used for reading magnetic storage media having data densities of 40 Gb/in$^2$ and more.

Figure 3A:
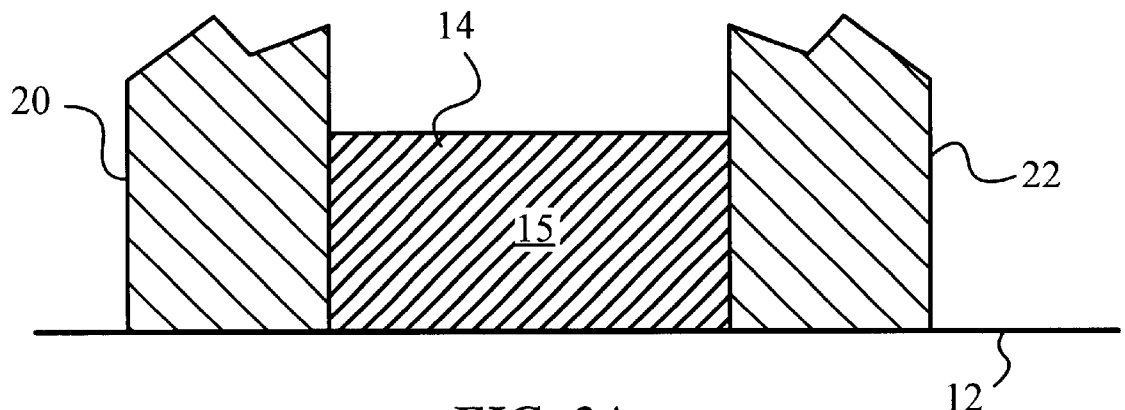
FIGS. 3A–B is a cross sectional view illustrating the making of a readback element by selective deactivation.
Figure 3B:
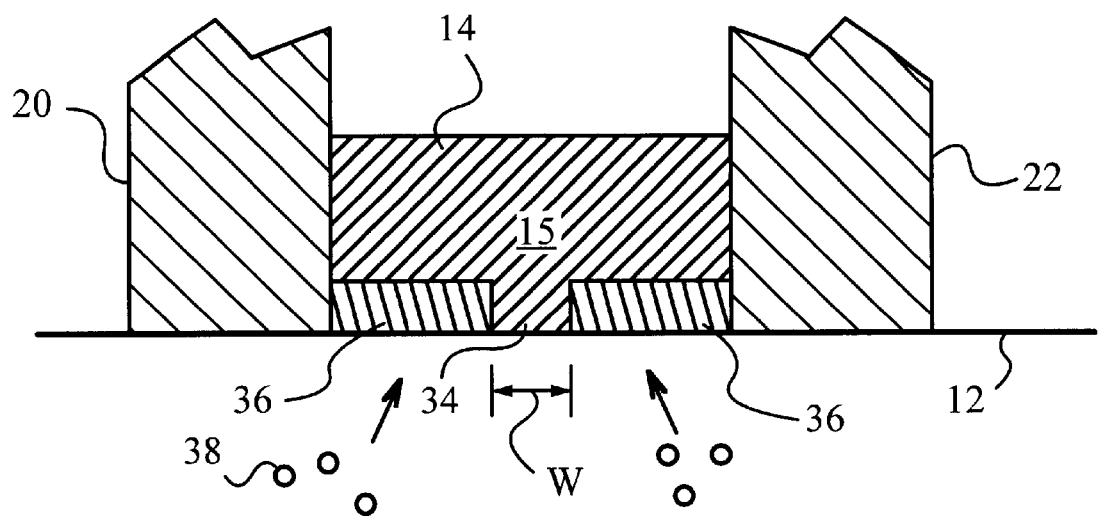

FIGS. 3A–B illustrate in cross section the preferred method of making element 14. First, element 14 of active material 15 is made by known thin film deposition and patterning processes and ABS surface 12 of slider 10 is lapped and finished in accordance with known techniques. Then, ions 38 for selectively deactivating material 15 in inactive region 36 are implanted in region 36. Preferably, the implantation is performed by a focused ion beam (FIB) technique. Ions 38 can be gallium, chromium, helium, neon, xenon, hydrogen, oxygen, nitrogen or other suitable ions capable of destroying the magnetic sensitivity of material 15. During implantation the FIB current should be kept sufficiently low such that element 14 is not thermally damaged and such that surface charging does not result in an arc over, which would burn out element 14. In addition, element 14 should be grounded to prevent burn out.

Figure 4:
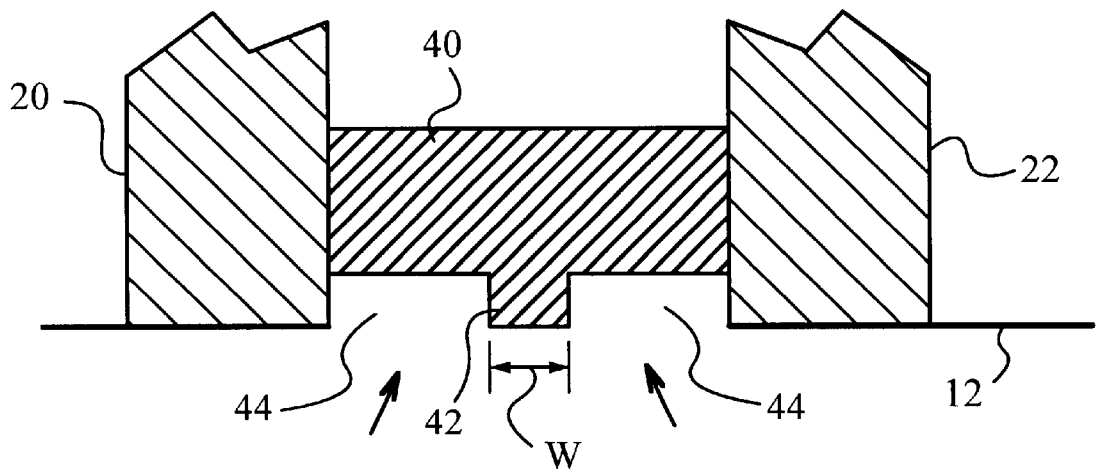
FIG. 4 is a cross sectional view illustrating the making of a readback element by selective removal.

FIG. 4 illustrates an alternative method of preparing a readback element 40 according to the invention. Like element 14, element 40 is also initially made of magnetically active material 15 and is positioned between leads 20, 22. During the step of defining an active region 42 shown in FIG. 4, portions of material 15 are selectively removed to create inactive region 44. The step of selectively removing material 15 are performed by an FIB technique or by etching. Inactive region 44 borders active region 42 and has no magnetic sensitivity. Hence, only active region 42 is capable of sensing magnetic domains 28.

EXAMPLE

Figure 5:
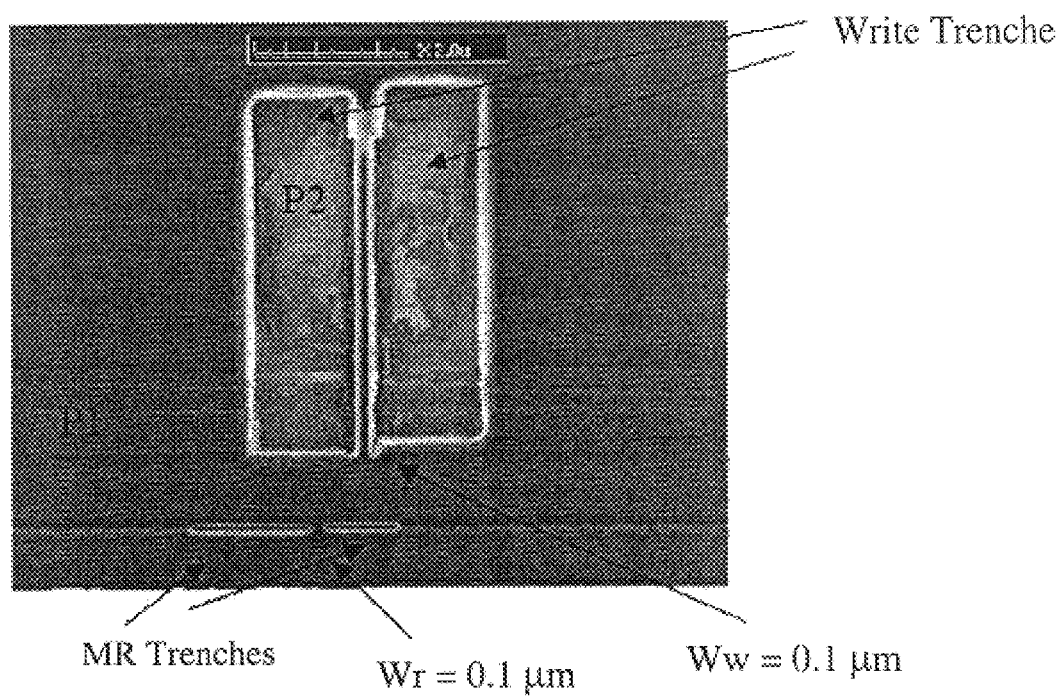
FIG. 5 is an FIB image of the air bearing surface with a readback element made according to the invention.

In one example a readback element is an MR readback element produced by selective removal of magnetically active material at the tip by physical etching. This can be done at the wafer level, the row level or to a finished slider. In the present example, the removal step was performed by FIB etching a finished MR element at the pole tips of a finished slider. The results are illustrated in FIG. 5.

Both the read and write heads are trimmed to approximately 100 nm wide, indicated by Wr and Ww, respectively. The etch depth for the MR element, MR Trenches, is 200 nm and the etch depth for the write head, Write Trenches, is 1 $\mu$m. In order to confirm that inactive regions are actually those selected for irradiation, during trimming the center of the trimmed MR element has been offset by approximately 300 nm from the center of the original MR element. This offset is observed in the final result.

Figure 6:
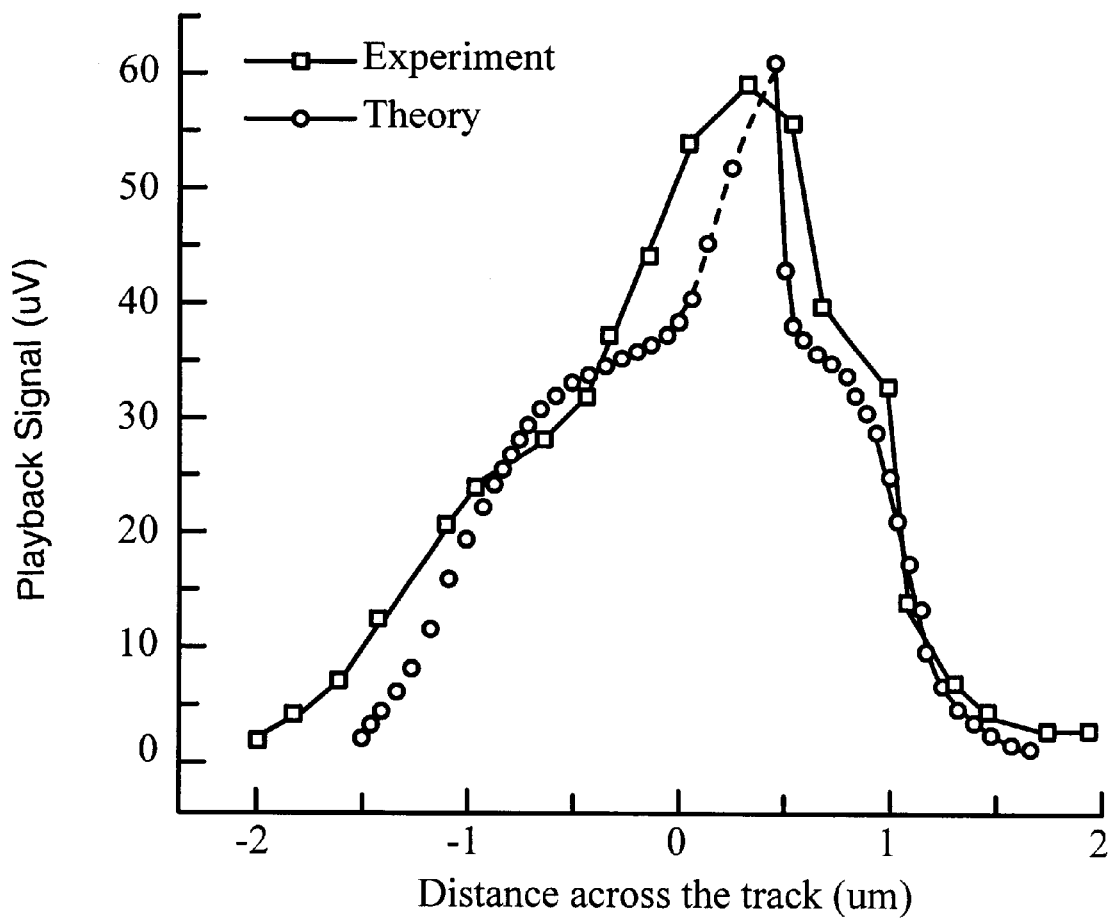
FIG. 6 is a graph illustrating the performance of the readback element of FIG. 5.

FIG. 6 shows a track profile taken by the MR element with its active region trimmed to a width W of 100 nm. The offset of approximately 300 nm in the location of the playback maximum corresponds to the physical location of the unetched portion or the active region of the MR element. The dashed line in FIG. 6 corresponds to a theoretical curve (arbitrary units) calculated using a commercial 3D boundary element field solver, which calculated the magnetic sensitivity function using the reciprocity principle. In those calculations, it was assumed that the pole tip material was magnetically soft.

A person of average skill in the art will also recognize that a readback element in accordance with the invention can be optimized for any given situation by adjusting the size, and in particular the depth of the deactivated region. In the embodiment where the magnetically active material is deactivated, this is done by adjusting the ion implant depth. A person of average skill in the art will further recognize that a readback element according to the invention does not have to be mounted in a slider. Furthermore, the readback element does not need to be integrated in a read/write head. In fact, a readback element with a narrowed active region can be used in any read device for reading magnetically recorded data from a magnetic storage medium.

Accordingly, the scope of the invention should be determined by the following claims and their legal equivalents.

What is claimed is:

1. A readback element for reading magnetic domains recorded in a magnetic storage medium, said readback element comprising:
    a magnetically active material having a magnetic sensitivity and a tip portion with a surface facing said magnetic storage medium, said tip portion further comprising:
        an active region comprising said magnetically active material having said magnetic sensitivity; and
        an inactive region bounding said active region and containing ions selected from the group consisting of gallium, chromium, helium, neon, xenon, hydrogen, oxygen, and nitrogen ions selectively implanted by focused ion beam, said implanted ions rendering said magnetically active material inactive so as to have substantially no magnetic sensitivity in said inactive region.

2. The readback element of claim 1, wherein said active region is less than 100 nm wide.

3. The readback element of claim 1 selected from the group consisting of magnetoresistive elements, giant magnetoresistive elements and spin tunneling elements.

* * * * *

UNITED STATES PATENT AND TRADEMARK OFFICE
CERTIFICATE OF CORRECTION

PATENT NO.    : 6,483,672 B1
DATED         : November 19, 2002
INVENTOR(S)   : Patrick C. Arnett et al.

It is certified that error appears in the above-identified patent and that said Letters Patent is hereby corrected as shown below:

<u>Title page,</u>
Item [57], ABSTRACT, insert the following:
-- A readback element made of a magnetically active material having a tip portion with an active region of width W and a deactivated region in which the magnetically active material is either selectively deactivated to have no or almost no magnetic sensitivity or selectively removed. The deactivation or removal can be performed by a focused ion beam technique. The width W of the active region determined the effective read track width and ranges from 500 nm to 100 nm and less. The readback element can be a magnetoresistive (MR), a giant magnetoresistive (GMR) or a spin tunnel element. --

Signed and Sealed this

Twelfth Day of August, 2003

JAMES E. ROGAN
*Director of the United States Patent and Trademark Office*